June 29, 1943.   R. D. JUNKINS   2,323,180
CONTROL SYSTEM
Filed Aug. 24, 1939    8 Sheets-Sheet 1

INVENTOR
Raymond D. Junkins

June 29, 1943.  R. D. JUNKINS  2,323,180
CONTROL SYSTEM
Filed Aug. 24, 1939    8 Sheets-Sheet 3

INVENTOR
Raymond D. Junkins

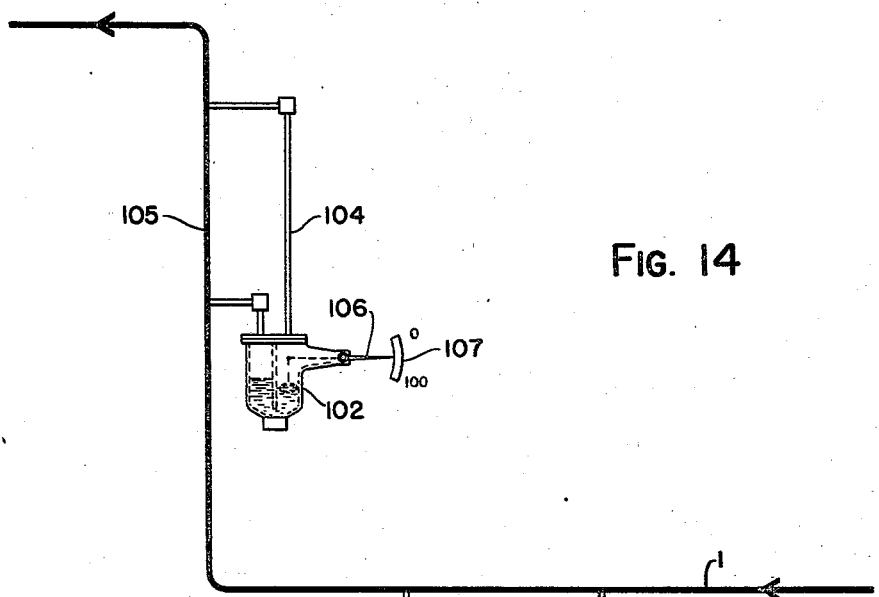
FIG. 14
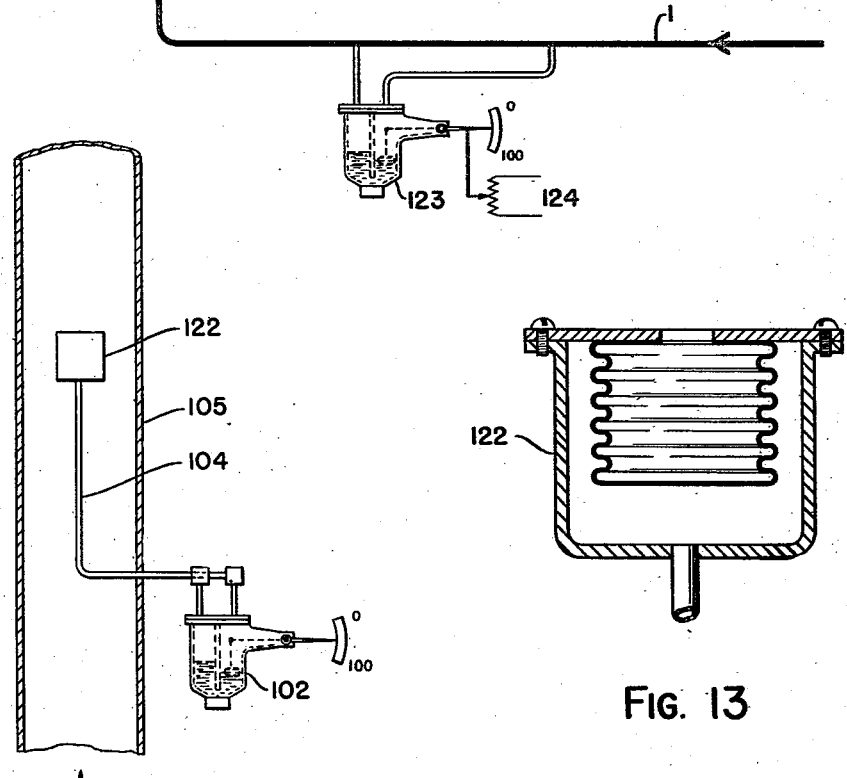
FIG. 13
FIG. 12

Patented June 29, 1943

2,323,180

UNITED STATES PATENT OFFICE 2,323,180

CONTROL SYSTEM

Raymond D. Junkins, Cleveland Heights, Ohio, assignor to Bailey Meter Company, a corporation of Delaware Application August 24, 1939, Serial No. 291,707

5 Claims. (Cl. 122—448)

This invention relates to the art of measuring and/or controlling the magnitude of a variable quantity, condition, relation, etc., and particularly such a variable condition as the density of a liquid-vapor mixture or such a homogeneous fluid as may exhibit two phases when a sample is withdrawn for a static determination of density, although the variation may be caused by changes in temperature, pressure, or any physical, chemical, electrical, hydraulic, thermal, or other characteristic.

My invention is particularly directed to a variable condition such as, for example, the density of a flowing fluid under treatment. A variation in the flowing fluid under treatment may be epitomized as a "condition" change and, for the purpose of this application, it will be understood that a condition change may be either a physical or a chemical change, or both, and that the method hereinafter outlined and the apparatus specified is designed to be effective for all such conditions.

"Condition change" refers to a change in the character or quality or condition of a fluid as distinguished from a quantity change such as rate of flow, or change in a position as, for instance, movement of the fluid from one tank to another. Moreover, whenever herein the word "treating" or "treatment" is used, it is to be understood that any acting upon or in connection with a fluid is intended; a fluid is treated when it is heated, when it undergoes chemical change, when two or more varying-characteristic fluids are brought together, when a fluid is electrolyzed, or when its degree of ionization is changed, as for instance by dilution, change of temperature, etc., and in general, when anything is done in connection with a fluid which is qualitative as distinguished from quantitative.

These terms "qualitative" and "quantitative" have reference to the broadest meaning thereof when used in connection with a definition of what is meant by "condition change"; for instance, the addition to or subtraction of heat from a fluid may merely cause it to expand or contract in size per unit of weight, but this change is nevertheless considered as qualitative rather than quantitative. Similarly, passage of electrical current from one electrode to another immersed in a fluid is considered to effect a qualitative change therein within this disclosure. In short, any phenomenon in a flowing fluid which so evidences itself as to be measured in the manner herein disclosed or in connection with a density determination is deemed to be a "condition change."

Having the foregoing in mind, it will be seen that condition changes may occur as a result of several different operations, sequentially or simultaneously. For instance, considering the change in density which occurs in a flowing fluid, such change may be the result of the heating of the fluid, or of an alteration in the chemical composition of the fluid without heat being imparted thereto, or of an expansion of the fluid while flowing through a treating zone, for instance by changing the volume per unit lineal distance of the space in which the fluid is traveling, or a combination of these effects may cause changes in the density of a flowing fluid with consequent production of a variable which may be used as a basis for fluid processing control. It should not, of course, be overlooked that similar differing conditions may also result in variations in temperature, pressure, and the other factors which vary in a process. Moreover, a temperature change may occur in a fluid entirely because of internal action and without any external subtraction or addition of heat; that is, as a result of chemical action.

I have chosen to illustrate and describe as a preferred embodiment of my invention its adaptation to the measuring and controlling of the density and other characteristics of a flowing heated fluid stream, such as the flow of hydrocarbon oil through a cracking still.

While a partially satisfactory control of the cracking operation may be had from a knowledge of the temperature, pressure and rate of flow of the fluid stream being treated, yet a knowledge of the density of the flowing stream at different points in its path is of a considerably greater value to the operator.

In the treatment of water below the critical pressure, as in a vapor generator, a knowledge of pressure, temperature, and rate of flow may be sufficient for proper control, inasmuch as definite tables have been established for interrelation between temperature and pressure, and from which tables the density of the liquid or vapor may be determined. However, there are no available tables for mixtures of liquid and vapor. In the case of petroleum hydrocarbons, and a vast majority of chemical compounds in general, there are no tables available for the liquid phase, the vapor phase or a mixed phase.

In the processing of a fluid, such as a petroleum hydrocarbon, a change in density of the fluid may occur through at least four causes:

1. The generation or formation of vapor of the liquid whether or not separation from the liquid occurs.
2. Liberation of dissolved or entrained gases.
3. Molecular transformation as by cracking or polymerization.
4. By simple change in heat content, for example, due to the temperature coefficient of expansion of the fluid.

The result is that no temperature-pressure-density tables may be established for any liquid, vapor, or liquid-vapor condition of such a fluid, and it is only through actual measurement of the density of the fluid, or of a mixture of the liquid and vapor, that the operator may have any reliable knowledge as to the physical condition of the fluid stream at various points in its treatment, or when it is subject to a condition change.

It will be readily apparent to those skilled in the art that the continuous determination of the density of such a flowing stream is of tremendous importance and value to an operator in controlling the heating, mean density, time of detention and/or treatment in a given portion of the circuit, etc. A continuous knowledge of the density of such a heated flowing stream is particularly advantageous where wide changes in density occur due to formation, generation, and/or liberation of gases, with a resulting formation of liquid-vapor mixtures, velocity changes, and varying time of detention in different portions of the fluid flow path. In fact, for a fixed or given volume of path, a determination of the mean density in that portion provides a possibility of determining the time that the fluid in that portion of the path is subjected to heating or treatment. By my invention I provide the requisite system and apparatus wherein a determination of such information comprises a guiding means for automatic control of the process or treatment.

Before treating or processing the fluid however, it is necessary that the quantity and condition of the charge fluid be ascertained and perhaps controlled. For example, in one system it may be essential that the weight rate of charge be held constant irrespective of the composition of the charge, or its condition, density, etc. In another system it may be important to maintain a predetermined condition, such as density, of the fluid being charged irrespective of variations in weight rate of charge.

A principal object of my invention is then to determine and/or to control the make-up or composition of the charge fluid, irrespective of where the fluid goes or to what treatment it later is subjected; to accurately and continuously determine the weight rate of charge and correct it for deviations in condition from a desired condition; to ascertain and evaluate the effect of charge composition upon the weight rate of charge; to ascertain and evaluate the effect of charge composition upon the stock factor or index of fluid treatment and processing; and to control such variables or to utilize such variables as control guides.

Referring for the moment to Fig. 7, I therein composition of the charge, or its condition, indicate that the total fluid C charged to the processing zone or zones is made up of fluid A and fluid B, either of which may vary in weight rate of flow and/or in composition or condition.

In the example (the processing of petroleum hydrocarbons) which I have chosen to illustrate and describe, the composition and/or condition of charging stock A may be affected by:

1. The functioning of the fractionating equipment from which stock A is derived.

2. In the event that stock A is a recycle stock, then by changes in the degree of decomposition of the fluid prior to fractionation.

3. Changes in the density or specific gravity of stock A due to changes in its temperature and/or pressure at flowing conditions.

The charging stock B is herein described (although not limited thereto) as comprising recirculated gas such as propane and butane, in gaseous or liquid state, or absorbed in a carrier fluid. While the conditions affecting stock A are also pertinent in connection with stock B they are usually even more critical than with stock A due to the difficulty of determining the density or specific gravity of stock B at atmospheric conditions. In the past it has been possible to arrive at any figure of density or specific gravity of flowing stock B only by an analysis of the fluid at atmospheric conditions and estimating the overall density by the sum of the constituents. Obviously the composition and condition of stock B at atmospheric condition will be quite different than under flowing condition. This emphasizes the need for a means such as 118 adapted to determine the in situ density or specific gravity of stock B.

When stock A and stock B are combined and form stock C all or any of the mentioned variables may affect the condition of the charge fluid C. Inasmuch as all measurements of weight rate of charge are dependent upon a constant density of the charge, or an accurate determination of density and automatic compensation of the charge weight rate determination when charge density varies from design value, it will be apparent that my invention is of singular utility, for a primary object of my invention is in the determination and control of the charge condition.

The functioning of a processing system such as the coils 14 and 15 is materially affected by variations in weight rate of fluid input, whether direct as to weight or indirectly by variations in density or other condition. This creates a need for an accurate and continuous determination of weight rate of input and control thereof and therefrom. Such a system I have provided.

While illustrating and describing my invention as preferably adapted to the cracking of petroleum hydrocarbons, it is to be understood that it may be equally adaptable to the vaporization or treatment of other liquids and in other processes; for example, in the distillation of oils, in the generation of steam, and other chemical and/or physical processes wherein a fluid is subjected to a condition change, as for example the heating of a fluid flow path. In particular, the invention relates to the automatic control of the treatment process, and as a specific example thereof I have illustrated and will describe the control of the rate of flow and of the heating in a cracking still.

Figure 7:
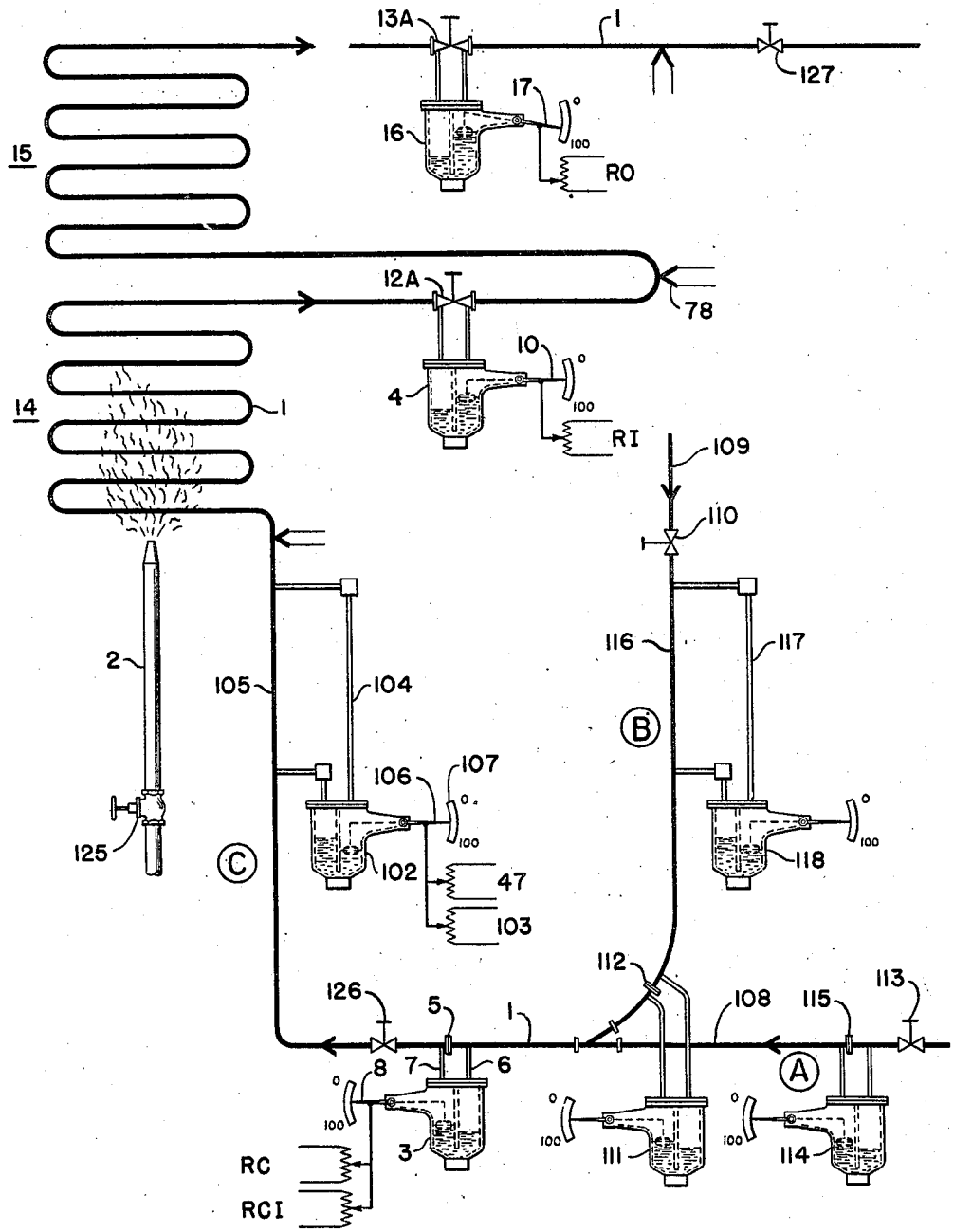

Fig. 7 diagrammatically illustrates a further embodiment of my invention.

Figure 8:
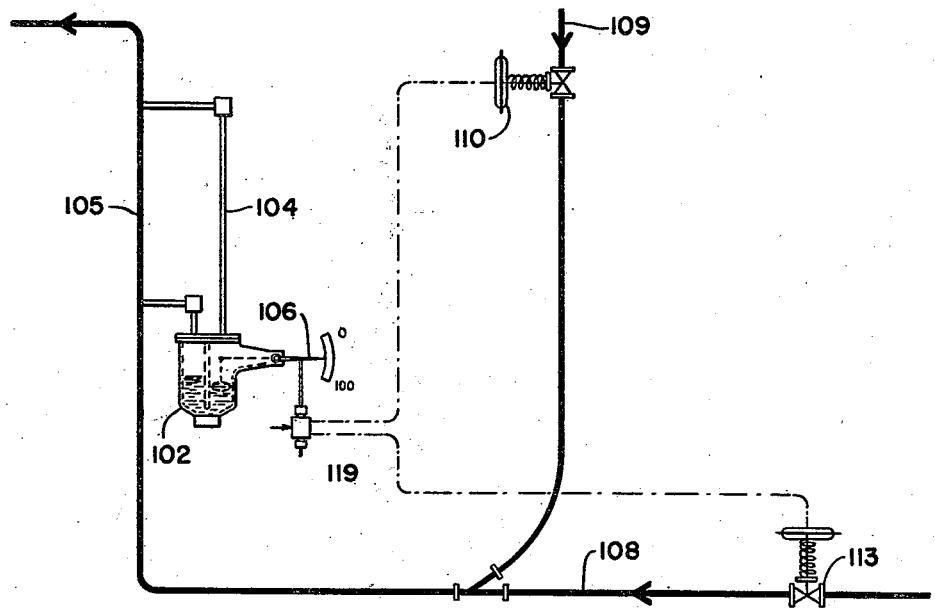

Fig. 8 is a modification of a part of Fig. 7.

Figure 9:
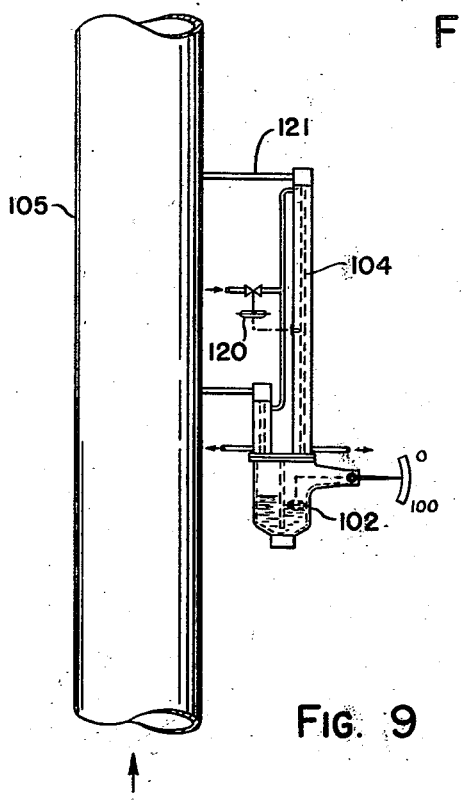

Fig. 9 is an arrangement of a specific gravity determining device.

Figure 10:
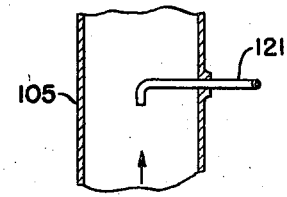
Figure 11:
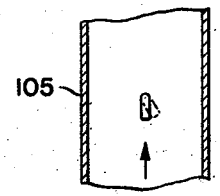

Figs. 10 and 11 are details of Fig. 9.

Fig. 12 is a modification of Fig. 9.

Fig. 13 is a detail of Fig. 12.

Fig. 14 is a modification of a part of Fig. 7.

Figure 2:
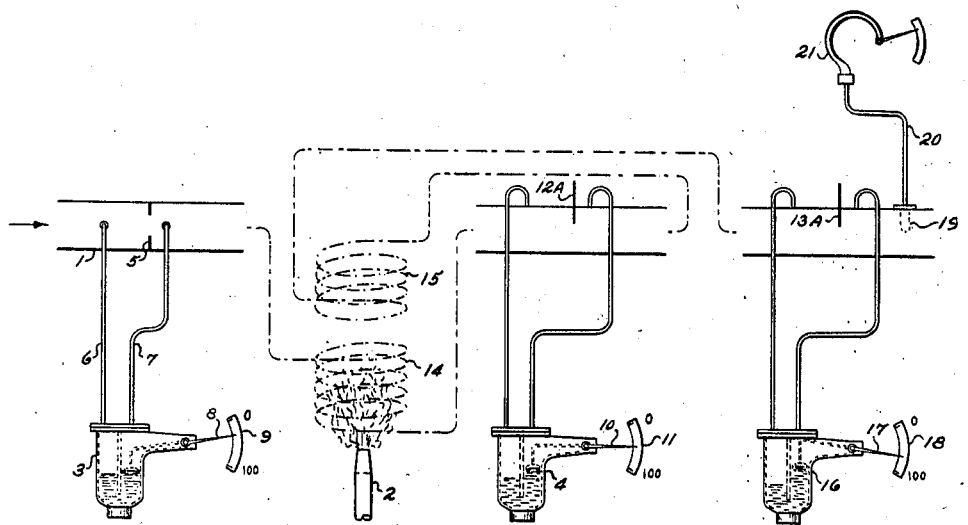
Fig. 2 is similar to Fig. 1, but includes a determination of mean density.
Figure 3:
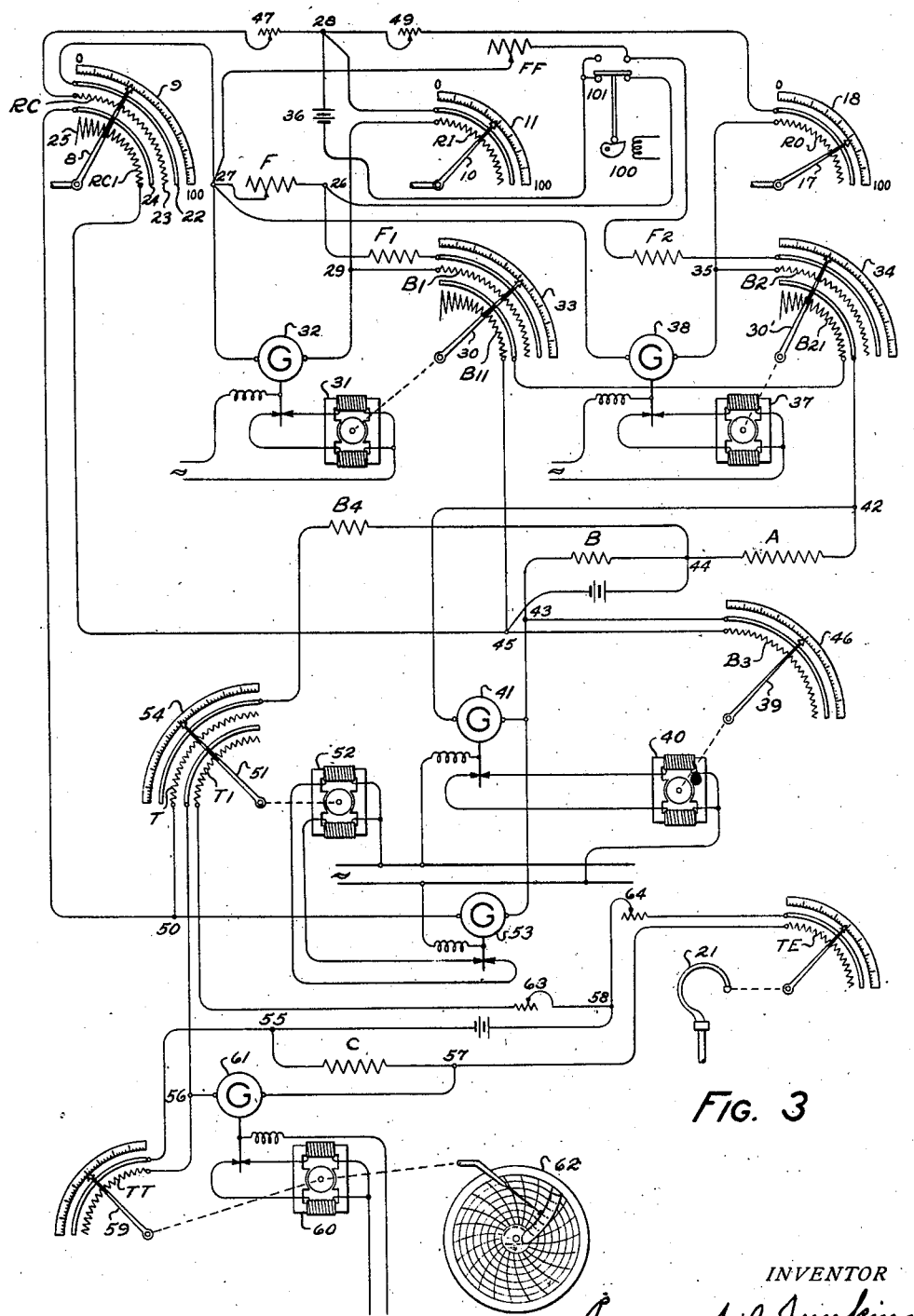
Fig. 3 is a diagrammatic arrangement of the invention in connection with a heated fluid stream.
Figure 15:
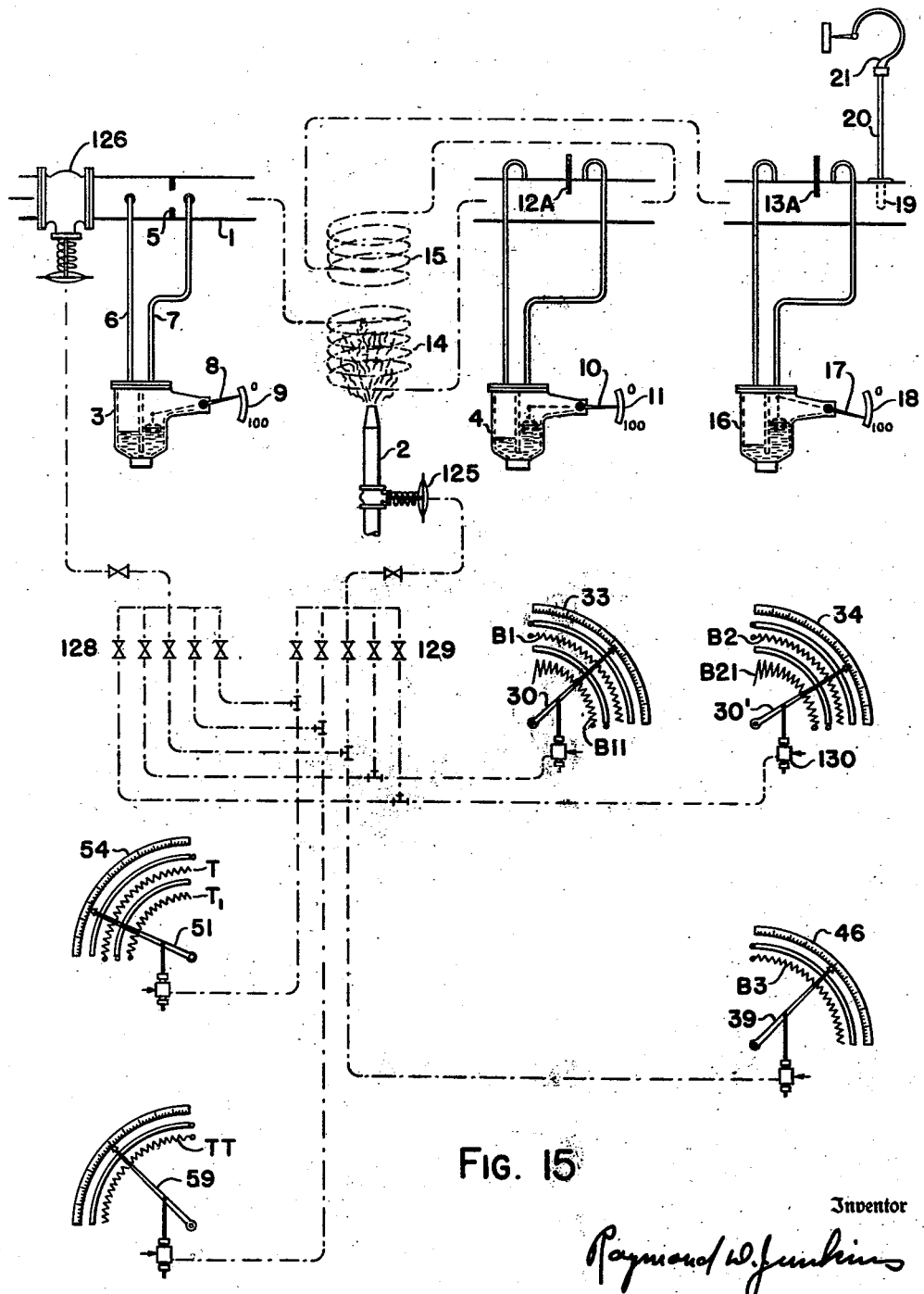

Fig. 15 is a diagrammatic combination of Figs. 2 and 3 with control adaptations.

Figure 16:
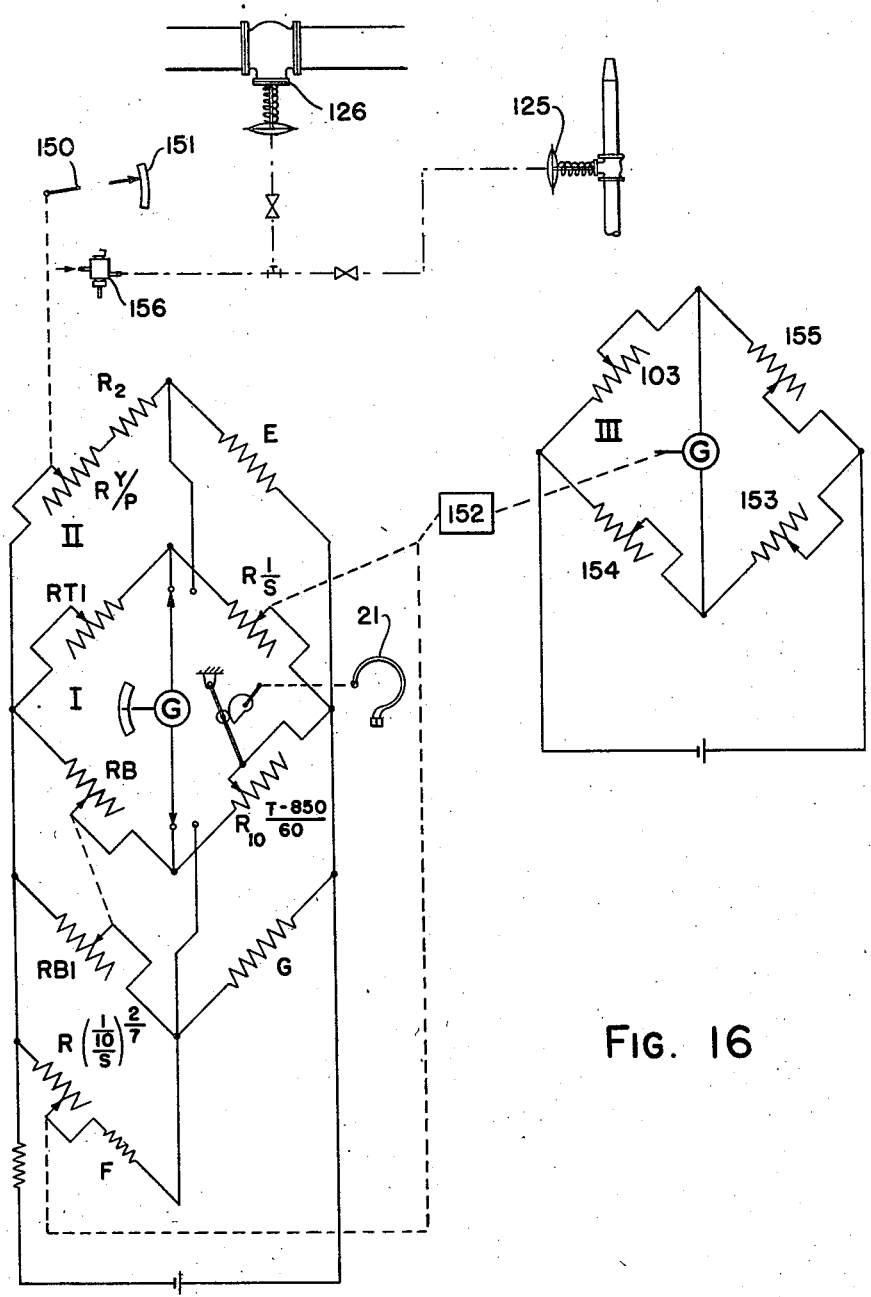

Fig. 16 is diagrammatic arrangement of the invention which indicates control of the treatment by an air loading pressure representative of the yield per pass.

Figure 1:
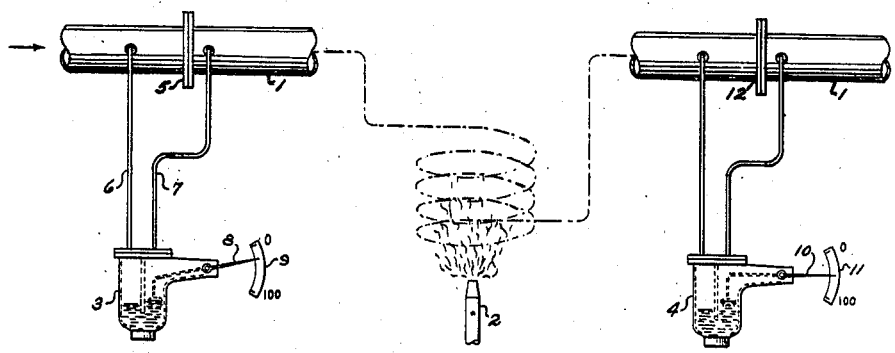
Fig. 1 is a diagrammatic representation of density measuring apparatus for a heated fluid stream.

Referring now in particular to Fig. 1, I indicate therein a conduit 1 which may be considered as comprising the once through fluid path of an oil still wherein a portion of the path is heated, as by the burner 2. With such an arrangement the fluid will undergo a condition change, and during such condition change the density of the fluid will change, so that the density at the outlet of the section which is being heated will be different from the density at the inlet of that section. If the section in question is the conversion section in an oil cracking furnace, the condition change brought about by the application of heat may be a physical change, or a chemical change, or a combination of the two. The rate of flow of the charge or relatively untreated hydrocarbon is continuously measured by the rate of flow meter or differential indicator 3, while a differential indicator 4 is located with reference to the conduit 1 beyond the heating means or after the flowing fluid has been subjected to a condition change such as heating or other processing.

While the fluid flow measuring instrumentalities 3 and 4 are illustrated and described as differential pressure responsive devices, it will be understood that such showing and description are illustrative only and not to be taken in a limiting sense, because fluid flow measuring devices such as displacement meters, volumetric meters, Thomas meters, or the like, may be used in the determination of fluid density in practicing the invention herein disclosed.

The float actuated meter 3 is sensitive to the differential pressure across an obstruction, such as an orifice, flow nozzle, Venturi tube, or the like, positioned in the conduit for effecting a temporary increase in the velocity of the flowing fluid. Such an orifice may be inserted in the conduit between the flanges, as at 5. The meter 3 is connected by pipes 6, 7 to opposite sides of the orifice 5 and comprises a liquid sealed U-tube, in one leg of which is a float operatively connected to position an indicator 8 relative to an index 9. In similar manner the indicator 10 of the meter 4 is positioned relative to an index 11; the meter 4 being responsive to the differential head across an orifice or similar restriction between the flanges 12.

The relation between volume flow rate and differential pressure (head) is:

$$Q = cM\sqrt{2gh} \qquad (1)$$

Where $Q$ = cubic feet per second
$c$ = coefficient of discharge
$M$ = meter constant (depends on pipe diameter and diameter of orifice hole)
$g$ = acceleration of gravity = 32.17 ft. per sec. per sec.
$h$ = differential head in feet of the flowing fluid The coefficient of discharge remains substantially constant for any one ratio of orifice diameter to pipe diameter, regardless of the density or specific volume of the fluid being measured. With $c$, $M$ and $\sqrt{2g}$ all remaining constant, then $Q$ varies as the $\sqrt{h}$. Thus it will be seen that the float rise of the meters 3, 4 and the reading on the indexes 9, 11 of differential head are directly indicative of volume flow. If the conduit size and orifice hole size are the same at both meter locations, then the relation of meter readings is indicative of the relation of density and specific volume; head varying directly with specific volume and inversely with density. Thus for the same weight rate of flow past the two metering locations the differential head at location 12 will increase with decrease in density of the fluid, and vice versa.

This may readily be seen, for if it were desired to measure the flowing fluid in units of weight, Equation 1 becomes:

$$W = cM\sqrt{2ghd} \qquad (2)$$

Where $W$ = rate of flow in pounds per second
$d$ = density in pounds per cu. ft. of the flowing fluid
$h$ = differential head in inches of a standard liquid such as water
$M$ = meter constant now including a correction between the density $d$ of the flowing fluid being measured and the density of the liquid in the manometer which is some standard such as water.

Assuming the same weight rate of flow passing successively through two similar spaced orifices 5, 12, and with a change in density as may be caused by the heating means 2, then the density at the second orifice 12 may be determined as follows:

$$W_{12} = W_5 \qquad (3)$$

$$\sqrt{2gh_{12}d_{12}} = \sqrt{2gh_5 d_5}$$

$$\sqrt{h_{12}d_{12}} = \sqrt{h_5 d_5}$$

$$d_{12} = d_5 \times \frac{h_5}{h_{12}}$$

Thus it will be observed that, knowing the density of the fluid passing the orifice 5, I may readily determine the density of the fluid passing the orifice 12 from the relation of differential pressures indicated by the meters 3, 4.

Referring now to Fig. 2, wherein like parts bear the same reference numerals as in Fig. 1, I indicate that after the fluid has passed through the orifice 12A it is returned to a further heating section of the still, from which it passes through a third differential pressure producing orifice 13A. The heating coil 14 will be hereinafter referred to as a first heating section, while the coil 15 will be referred to as a second heating section. In the preferred arrangement and operation of the still the section 15 is the conversion or cracking section, and the one in which it is primarily desirable to continuously determine the mean density of the fluid, as well as its time of detention or treatment in this section. For that reason I now desirably determine the mean density of the fluid in the section 15 and accomplish this through an interrelation of the differential pressures produced by the same weight rate of flow passing successively through the orifices 5, 12A, 13A.

The same total weight of fluid must pass through the three orifices in succession so long as there is no addition to or diversion from the path intermediate the orifices. It is equally apparent that in the heating of a petroleum hydrocarbon, as by the coil 14 between the orifices 5 and 12A, there will be a change in density of the fluid between the two orifices, and furthermore that an additional heating of the fluid, as by the coil 15, will further vary the density of the fluid as at the orifice 13A relative to the orifice 12A.

Assume now that the conduit 1 is of a uniform size throughout and that the orifices 5, 12A and 13A are of a uniform opening area and coefficient or characteristic. Through the agency of the meter 16 the differential pressure existing across the orifice 13A is continuously indicated upon an index 18 by an indicator 17. The mean density of the conversion section 15 is then obtained by averaging the density of the fluid at the orifices 12A and 13A. As for example:

$$md_{15} = \frac{d_{12A} + d_{13A}}{2} \quad (4)$$

The density of the flowing fluid at the orifice 13A may be obtained in the same manner, relative to the density of the fluid at the orifice 5, as previously determined (3) for the density of the flowing fluid at the orifice 12A. Simplifying this into a single operation I have:

$$md_{15} = \frac{d_5 \times \frac{h_5}{h_{12A}} + d_5 \times \frac{h_5}{h_{13A}}}{2}$$

$$= d_5 \frac{\frac{h_5}{h_{12A}} + \frac{h_5}{h_{13A}}}{2} \quad (5)$$

Thus the mean density of the flowing fluid in the conversion section 15 (knowing the density or specific gravity of the fluid entering the system) may be directly computed from the readings of the indexes 9, 11, 18. This, of course, on the basis that the orifices 5, 12A, 13A are the same, and that the capacity of the float meters 3, 4, 16 are the same.

Now as the specific volume increases progressively from locations 5 to 12A to 13A the differential pressure across these orifices increases in like manner, and in the operation of such a cracking still it may be that the differential pressure across an orifice 13A will be several times that across the orifice 5 if the orifice sizes are equal. I have, therefore, indicated at 12A, 13A of Fig. 2 that these orifices may be of an adjustable type wherein the ratio of orifice hole to pipe area may be readily varied externally of the conduit through suitable hand wheel or other means. The actual orifice design in terms of pounds per hour is:

$$W = 360 \, cfd^2 \sqrt{\frac{\text{max. } h}{\text{sp. vol.}}} \quad (6)$$

where

W = pounds per hour
D = diameter of equivalent circular orifice hole in inches
c = coefficient of discharge
f = factor of approach
sp. vol. = cu. ft./lb.

Now considering that orifice 12A is so adjusted that its $cfD^2$ is different from that of orifice 5, I may then determine the density at 12A as follows:

$$D_{12A} = CR^2$$

where $$C = d_5 \left(\frac{cfD_5^2}{cfD_{12A}^2}\right)^2$$

$$R = \frac{\sqrt{h_5}}{\sqrt{h_{12A}}}$$

$$d_{12A} = d_5 \left(\frac{cfD_5^2}{cfD_{12A}^2}\right)^2 \times \left(\frac{\sqrt{h_5}}{\sqrt{h_{12A}}}\right)^2 \quad (7)$$

In similar manner I may determine the density at the orifice 13A regardless of the orifice area, so long as I take into account the $cfD^2$ of the orifice in the above manner. It will thus be seen that, if the specific volume of the flowing fluid increases so rapidly that the differential head at successive orifice locations (for the same design of orifice) becomes many times the value of the differential head at the initial orifice, it would be impractical to attempt to indicate or record such differential head relative to a single index or record chart without one or more of the indications or records going beyond the capacity of the index or chart. There are two ready means of overcoming this practical difficulty, the first being an adjustment of the successive orifices, such as 12A, 13A to have new values of $cfD^2$ such that the indicator or recording pen will be kept on the chart; and the second through varying the basic capacity of the meter 4 or 16 relative to the meter 3. The latter method is accomplished by so arranging the meter 4, for example, that it requires 50% greater differential pressure to move the related pointer over full index range than in the case of meter 3. This may readily be accomplished by properly proportioning the two legs of the mercury U-tube, on one of which the float is carried. Of course it will be necessary to take such changes in capacity into account when utilizing the differential head readings in determining density or mean density.

For example, the reading of the pointer relative to the index should be on a percentage basis of whatever maximum head the meter is designed for. Then the total head corresponding to the indicator reading will be available or the proper correction may be applied. Assume that the meter U-tube 3 is so shaped that it requires 120" water differential applied thereto to move the indicator 8 from 0 to 100% travel over the index 9, and that for meters 4 and 16 it requires 250" water differential to cause the indicator 10 to move from 0 to 100% over the index 11, and 17 relative to 18. Then:

$F_3$ = % float travel of meter 3
$F_4$ = % float travel of meter 4

$$\frac{h_5}{h_{12A}} = .48 \frac{F_3}{F_4}$$

substituting in (7)

$$d_{12A} = d_5 \left(\frac{cfD_5^2}{cfD_{12A}^2}\right)^2 .48 \frac{F_3}{F_4} \quad (8)$$

and $$md_{15} = \frac{.48 d_5}{2}\left[\left(\frac{cfD_5^2}{cfD_{12A}^2}\right)^2 \frac{F_3}{F_4} + \left(\frac{cfD_5^2}{cfD_{13A}^2}\right)^2 \frac{F_3}{F_{16}}\right] \quad (9)$$

In Fig. 3 I show in diagrammatic fashion an arrangement similar to that of Fig. 2 but adapted to give further indications valuable as a guide to operation of the treating system by manual or automatic means. Herein I illustrate mechanism under control of the meters 3, 4, 16 for making directly and visually available the information I desire for the manual or automatic control of the cracking still.

In the operation of such a cracking still it is of considerable importance to determine, in addition to the mean density, the time of detention of the fluid in various portions of the fluid flow path. It is also of importance to determine the time-temperature relation of the conversion section. For example, the time that any particle remains in this section and the temperature to which it is subjected, or the temperature at which the mixture leaves the section. To determine such temperature, I indicate in Fig. 2 at 19 the bulb of a gas-filled thermometer system of which 20 indicates the connecting capillary and 21 a Bourdon tube whose free end is positioned responsive to the temperature at the bulb location.

According to Equation 5 it is necessary, in determining the mean density of the conversion section 15, to obtain the ratio of the differential heads at orifices 5 and 12A. Then to obtain the ratio of the differential heads at orifices 5 and 13A. To then average these ratios. My invention is based in general on the use of the Wheatstone bridge through whose agency ratios may be directly obtained. With such a system the meters 3, 4, 16 may, with a minimum of work, position a contact arm relative to a resistance forming an arm of a Wheatstone bridge. The system lends itself readily to the remote grouping of the apparatus necessary to indicate the individual values or relations and which I desirably locate convenient to the operator for hand or automatic control of the process.

The arm 8 of meter 3 is of insulating material but carries a conducting portion adapted to continuously contact a metallic segment 22 and to movably engage a rheostat 23 providing a resistance RC representative of the position of the float of meter 3, or $F_5$. A second conducting portion on the arm 8 contacts a metallic segment 24 and movably engages a rheostat 25 providing a resistance RCI. In similar manner the arm 10 provides a resistance RI representative of $F_4$; and the arm 17 provides a resistance RO representative of $F_{16}$.

Figure 4:
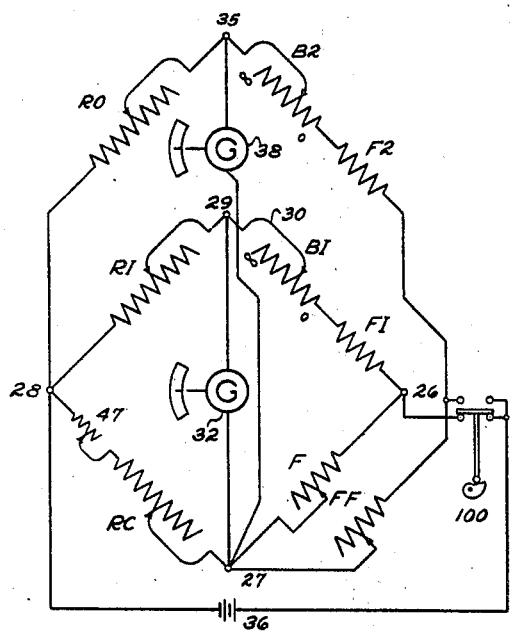
Figs. 4, 5 and 6 are simplified wiring diagrams of the composite wiring of Fig. 3.

Referring now to Fig. 4 it will be observed that the adjustable resistances RC and RI comprise two arms of a Wheatstone bridge. A third arm includes a hand adjustable resistance F, while a fourth arm includes a fixed resistance FI, and an adjustable resistance BI. The value of the resistance FI is substantially the same as that of the resistance F. The resistance BI is known as the balancing resistance and is varied by movement of the arm 30 (Fig. 3) through the agency of the reversible synchronous motor 31 under control of a galvanometer 32.

The motor 31 is of the self-starting synchronous type of alternating current motor and is shown as having normally energized opposed fields. Should the Wheatstone bridge become unbalanced, then the needle of the galvanometer 32 will move either clockwise or counterclockwise (Fig. 3), thereby open-circuiting one of the fields of the motor 31, resulting in a positioning of the arm 30 in direction and amount over the resistance BI to balance the bridge and cause the galvanometer needle to return to neutral position. It will be understood that the necessary gear reduction is incorporated between the motor 31 and the arm 30 so that the arm 30 moves at a relatively slow speed.

The Wheatstone bridge thus serves to continuously determine the density at 12A through solving Equation 8. Such density is continuously indicated on the index 33 and the value $d_{12A}$ is continuously represented by the resistances BI and BII.

Solving Equations 3 and 8

$$d_{12A}=d_5\times\frac{h_5}{h_{12A}}$$

Now $RC \propto h_5$
$RI \propto h_{12A}$
$RO \propto h_{13A}$

And it is expected that:

$d_5 > d_{12A} > d_{13A}$
$h_5 < h_{12A} < h_{13A}$
$RC < RI < RO$

It is known that the law of the Wheatstone bridge is:

$$\frac{RI}{BI+FI}=\frac{RC}{F}$$

$$BI=\left(F\times\frac{RI}{RC}\right)-FI$$

When RC and RI are both zero; and the value of BI is zero; F equals FI.

When RI>RC then the index 33 may be arranged to read the density $d_{12A}$ directly. The resistance BI will tend to vary from zero to $\infty$. However, as the value of resistance BI1 is to be directly representative of $d_{12A}$, the rheostat BI1 must be shaped as the reciprocal of $$\frac{RI}{RC}$$

or as $$\frac{RC}{RI}$$

and will tend to vary as the reciprocal of zero to $\infty$.

In like manner the value of $d_{13A}$ will be indicated on the index 34 and be continuously represented by the value of the resistance B21.

As clearly indicated (Fig. 4), the same power source 36 is alternatively used for both bridges. A motor 37 for the second bridge is under the control of a galvanometer 38 connected across the points 27, 35.

In the second bridge a hand adjustable resistance FF has substantially the same resistance value as F2. In fact, under zero flow conditions the values of F, FI, FF and F2 should be equal.

A time motor driven cam 100 continuously reciprocates a switch 101 alternately connecting the power source 36 into the two bridges. When either bridge is not connected to the power source 36 the galvanometer of that bridge remains at its neutral position and the various resistance values remain unchanged until the power source 36 is again connected to that bridge.

Figure 5:
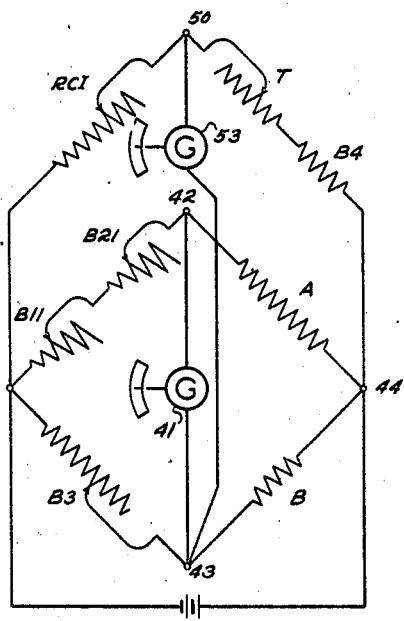

It will now be observed that the resistance BI1 is representative of the value $d_{12A}$ while the resistance B21 is representative of the value $d_{13A}$. To determine the mean density of the fluid through the conversion section 15 ($md_{15}$) I obtain the average of the ratios of heads (Equation 5) and accomplish this by including the resistances BI1 and B21 in a third bridge circuit (Fig. 5). In this bridge circuit the value of the fixed resistance A is twice that of the value of the fixed resistance B. Adjustable resistance B3 is varied by the positioning of an arm 39, through the agency of a motor 40, under the control of a galvanometer 41.

$$\frac{B3}{B} = \frac{(B11+B21)}{A}$$

$$B3 = \frac{(B11+B21)B}{A}$$

but $$A = 2B$$

and $$B3 = \frac{B11+B21}{2}$$

$$= md_{15}$$

The arm 39 will then indicate, relative to the index 46, the value of $md_{15}$ and the value of the resistance B3 will be representative of $md_{15}$.

In designing the apparatus I incorporate an average expected value of specific gravity or density of the fluid at the orifice 5 in the resistance RC or the motion of the arm 8. Additionally, I provide a hand adjusted rheostat 47 for taking care of variations in density of the fluid at the orifice 5 which may occur from time to time. Further, in this disclosure I will describe an automatic means for positioning the rheostat 47 directly with the value of density of the fluid at the orifice 5.

In similar fashion I design into the apparatus the expected value of $cfD^2$ in connection with the resistance RI and also for the expected value of $cfD^2$ in connection with the resistance RO. The auxiliary resistance F is moved by hand when a change in $cfD^2$ value for the orifice 12A is made by the adjustable means provided. In the same manner, if the adjustable orifice 13A is moved to a new position and value of $cfD^2$, the resistance FF is correspondingly varied.

The arm 8 is adapted to vary resistance RC1 proportional to $\sqrt{h_5}$ which so long as $d_5$ remains constant equals W, where W is rate of flow. This value is then included as an arm in a Wheatstone bridge circuit (Fig. 5) including the resistance B3, the fixed resistance B, an equal fixed resistance B4 and an adjustable resistance T; to determine the time of detention of any particle of fluid in the heating section 15.

$$\frac{RC1}{T+B4} = \frac{B3}{B}$$

$$T = \left(B \times \frac{RC1}{B3}\right) - B4$$

where $$B4 = B$$
$$RC1 = \sqrt{h_5} = W$$
$$B3 = md_{15}$$

and $$T_x = \frac{Vmd_{15}}{W} = \frac{1}{T}$$

where $T_x$ = Time any particle is in section 15
V = Volume between 12A and 13A (cu. ft.)
$md_{15}$ = Mean density (lbs. per cu. ft.)
W = Rate of flow (lbs. per unit time)

The resistance T is varied through movement of an arm 51 positioned by a motor 52, under the control of a galvanometer 53. An index 54 may be graduated to read directly in value of time of detention of any particle in section 15. In order that the resistance RC1 will represent the value of W, or rate of flow in pounds per unit of time, the resistance 25 is shaped according to $\sqrt{h_5}$.

Figure 6:
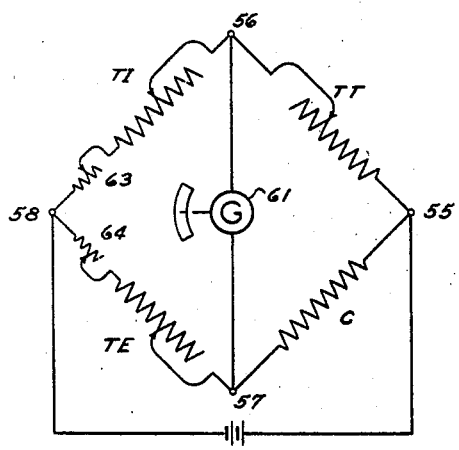

With the resistance T, is varied a resistance T1, representative of time of detention, and this is incorporated in a bridge circuit (Fig. 6) in relation to a resistance TE, representative of value of temperature, positioned by the Bourdon tube 21. The bridge circuit of Fig. 6 includes a resistance TT varied by an arm 59 moved by a motor 60, under the control of a galvanometer 61, for advising desired ratio or relation between time and temperature represented respectively by T1 and TE. This relationship may be continuously recorded as at 62. Hand adjustable rheostats 63, 64 allow adjustment for constants of time and temperature as may become necessary. Resistance C has a fixed value.

It will readily be appreciated that quantity rate (W) of the constituent flows and/or the total charge is of great importance in the time (T$_x$) equation, and furthermore that variations in condition (from design value) of the charge fluid being measured by the meter 3 will instantly affect the weight rate measurement. Thus my invention in connection with the charging stock, is of great importance in determining time of detention in the treating zone.

Likewise, in the yield per pass equation I use time of detention and stock factor, both of which depend upon the condition of the charging stock and therefore depend upon a determination continuously of said condition or conditions.

Having determined a relation between time of detention of the fluid in the conversion section 15 of the flow path and having determined the temperature of the fluid in the section 15 I may interrelate this relation with a value of stock characteristic factor in another Wheatstone bridge circuit to obtain a value of yield per pass for indication, record, or control purposes.

The yield per pass equation may be in its simplest form expressed as follows:

$$Y/P = \frac{AB}{B+A}$$

where $$A = \frac{1}{\left(\frac{10}{S}\right)^{\frac{2}{7}}}$$

$$B = .025St10^{\frac{T-850}{60}}$$

S = Stock factor
$t$ = Time
T = Temperature

This however is the equation for the total resistance of an electric circuit having two parallel branches. Accordingly, I may solve the equation to determine Y/P by means of a Wheatstone bridge having one leg in which there are two parallel branches, the resistance of one branch being varied proportional to B and the other proportional to A.

It is first necessary, of course, to determine B.

This is done by the first bridge of Fig. 16 comprising resistances RB, RT1, $$R\frac{1}{S}$$

and $$R10^{\frac{T-850}{60}}$$

in which:

$RT1$ is proportional to $t$ $R\frac{1}{S}$ is proportional to $\frac{1}{S}$ $R10^{\frac{T-850}{60}}$ is proportional to $10^{\frac{T-850}{60}}$ and $$RB = \frac{RT1 R10^{\frac{T-850}{60}}}{R\frac{1}{S}}$$

$$= RT1 R10^{\frac{T-850}{60}} RS$$

The resistance $$R10^{\frac{T-850}{60}}$$

is moved by the Bourdon tube 21 measuring temperature (Fig. 2). This resistance has a logarithmic taper so that actually the resistance varies as $$10^{\frac{T-850}{60}}$$

with respect to temperature. The actual mechanical arrangement between the Bourdon tube and the logarithmic taper resistance includes a cam so that any functional relation desired may be obtained between temperature and resistance.

Yield per pass is determined by the second bridge of Fig. 16 comprising the resistances $$R\frac{1}{\left(\frac{10}{S}\right)^{\frac{2}{7}}}$$

and RBI in parallel, R Y/P, E and G.
The resistance $$R\frac{1}{S}$$

is automatically continuously positioned in functional relation to S (stock factor).

From the bridge equation:

$$\frac{R\frac{Y}{P}}{R\frac{1}{\left(\frac{10}{S}\right)^{\frac{2}{7}}} RBI} = \frac{E}{G}$$

$$R\frac{1}{\left(\frac{10}{S}\right)^{\frac{2}{7}}} + RBI$$

or:

$$R\frac{Y}{P} = \frac{E}{G} \frac{R\frac{1}{\left(\frac{10}{S}\right)^{\frac{2}{7}}} \times RBI}{R\frac{1}{\left(\frac{10}{S}\right)^{\frac{2}{7}}} + RBI}$$

$$\frac{Y}{P} = \frac{A \times B}{A + B}$$

The resistance $$R\frac{1}{\left(\frac{10}{S}\right)^{\frac{2}{7}}}$$

will be mechanically moved with $$R\frac{1}{S}$$

The shape of the two resistance curves is quite similar, particularly for any given range in stock factors, but of course the resistances may be shaped as necessary one relative to the other.

The reversing power mechanism which positions the balancing resistance $$R\frac{Y}{P}$$

simultaneously positions an arm 150 relative an index 151 for indicating the value of yield per pass.

The resistances $$R\frac{1}{S}$$

and $$R\frac{1}{\left(\frac{10}{S}\right)^{\frac{2}{7}}}$$

are simultaneously positioned in desired relation to stock factor by a reversing power mechanism 152 controlled by the galvanometer of bridge III of Fig. 16. In this bridge are included the resistance 103 (Fig. 7) continuously representative of the specific gravity of the charge fluid, resistance 153 hand adjusted representative of the value of aniline number of the charge and hand adjusting or calibrating resistances 154, 155.

Experiments appear to show that the quality of the stock (stock factor), insofar as it affects the crackability of a petroleum hydrocarbon, is essentially a function of molecular weight and hydrogen-carbon ratio. As the variables indicative of these properties, the A. P. I. gravity and the aniline number, respectively, are selected, these quantities being determined sufficiently easily and rapidly to provide information regarding stock character as frequently as is necessary in commercial operation. A particular feature of the present invention is the provision of automatic means for establishing a resistance value representative of density or specific gravity of the charge, so that this value may be incorporated automatically and continuously in solving the yield per pass equation and weight-rate of input.

Thus by my present invention I provide means for automatically positioning the resistance 47 of Fig. 4 in accordance with the actual density of the charge fluid at the orifice 5 and in connection with correct weight-rate of input. This assumes particular importance in connection with the remainder of my disclosure.

By my invention I also provide means for automatically positioning a resistance 103 in accordance with the density or specific gravity of the charge fluid for use in continually arriving at the yield per pass of the treating zone. I periodically sample the charge for aniline number and determine what correction to make, if any, in a hand adjustable resistance in the yield per pass calculating circuit. Specific gravity may vary frequently and by automatically determining its value and compensating the yield per pass calculation I have greatly aided the accuracy of determination of yield per pass or efficiency of the conversion process.

By yield per pass, in the present embodiment for example, I mean the yield by weight of gasoline plus gas on a single pass of the fluid through the treatment path. With any fluid undergoing treatment I mean the yield of desired products in a single pass.

Previous literature dealing with rates of cracking suggests that a time-temperature index may be constructed to enable a correlation of yield per pass with time and temperature. Tests conducted with charging stocks of different qualities made it evident that the observations as a whole could not be correlated on such a simple basis, and it was found necessary to characterize the stocks in some way which would indicate their varying behaviour under cracking conditions. Thus the yield for a given stock is a function of time and temperature; but with the possibility of varying stock during treatment a stock factor as above outlined must be taken into consideration.

In Fig. 7 I show in diagrammatic form an arrangement wherein a device 102 is continually responsive to density of the charge fluid entering the heating section 14 of the path 1, and positions resistances 47, 103 in accordance therewith and representative thereof; the resistance 47 included in the circuits of Fig. 4, and the resistance 103 useful in determining yield per pass.

The device 102 is a float actuated liquid sealed U-tube continuously balancing the weight of a vertical column of known liquid 104 against a vertical column 105 of equal length of the fluid within the path 1. If the ambient temperature surrounding the columns 104, 105 remains constant, the arm 106 may be calibrated to indicate relative the index 107 directly the density of the fluid in the path 1 at 105.

In Fig. 7 I have illustrated the charge fluid C passing to the still through the orifice 5, as composed of a charging stock A entering by the branch pipe 108 and a supply B of gas such as propane and/or butane entering through the branch pipe 109. The propane and/or butane may be substantially pure hydrocarbons of those forms condensed to a liquid, or it may be either or both in gaseous form absorbed into an absorbing oil. In any event the fluid entering the circuit through the branch 109 is preferably a homogeneous mixture.

Such a cracking still as that illustrated diagrammatically in Fig. 7 may be charged with a suitable proportion by weight-rate of recirculated gaseous products through the branch 109 and the remainder of the charging stock through the branch 108. I provide in the branch 109 a control valve 110 which may be positioned by hand or automatically to control the weight rate of flow of fluid therethrough. I further provide a differential pressure responsive meter 111 connected across an orifice 112 to continually indicate and/or record the rate of flow of fluid through the branch 109 to the charge line 1. The meter 111 may be calibrated to indicate, in terms of differential pressure, volume rate of flow, or weight rate of flow.

In the branch 108 I provide a control valve 113 which may be manually or automatically actuated. I further provide a meter 114 connected across an orifice 115 for providing a continuous measure of the rate of supply therethrough. Thus by visual observation of the readings of meters 111, 114 the operator may regulate the valves 110, 113 to attain desired proportionality between the gas supplied through the branch 109 and the oil supplied through the branch 108. Such proportionality may be checked to a desired proportionality on a weight rate or volume rate basis by comparison of the meters 111, 114; or the proportionality may be so controlled as to result in a desired density or specific gravity of the total charge passing through the vertical column 105, and this value may be checked by observation of the indicator 106 relative to the index 107.

I have provided the branch 109 with a vertical column 116 across which is connected a column 117 to a meter 118 for providing a continuous determination of density or specific gravity of the fluid passing through the branch 109. In like manner I might provide a means for continually determining the density or specific gravity of the oil entering the branch 108.

The cracking of petroleum in the presence of injected gases, for example, the recirculated gaseous products, presents a type of operation wherein the character of the stock is subject to considerable variation, due to fluctuations in the quantity and character of the recirculated gases. When such a system is operated with prior art control devices these variations in charging stock are not readily made manifest to the operator. By means of my invention the character and quantity-rate of the constituent and total charge flows may be continuously determined and utilized in control.

Such recirculation makes it all the more important to continually determine the density or specific gravity of the total charge for use in the determination of time of detention within the treatment zone and for use in determination of the yield per pass.

As the temperatures and pressures are increased, and as the ultimate yield as well as the octane rating of the product are raised, it becomes increasingly important to have an instantaneous and continuous guide to operation for manual or automatic control to attain optimum conditions. Density determination becomes all the more important in determining the time of detention, for with the higher operating temperatures the time of detention at such temperature becomes more critical. All of these things tend to emphasize the need for accurate determination of density, mean density, time of detention, time-temperature relation, yield per pass, and control of the treatment therefrom.

In Fig. 8 I illustrate an arrangement for automatically regulating the proportioning of gas to oil to maintain a desired predetermined density or specific gravity of the charge. The density responsive device 102 is adapted to position the lands of a pilot 119 controlling the value of a loading pressure to a diaphragm actuated regulating valve 110 in the branch 109 and to a diaphragm actuated regulating valve 113 in the branch 108. The pilot valve 119 is of the type disclosed and claimed in the patent to Johnson 2,054,464 and it will be observed that herein I have utilized the upper and the lower lands. In explanation of the operation I would say that as the stem of the pilot assembly 119 is moved upwardly the loading pressure within the pipe leading to the valve 110 is increased while that in the pipe leading to the valve 113 is decreased. Obviously, the seating arrangements of the valves 110, 113 may be so arranged and proportioned that the flow proportionality through the branches 109, 108 may be relatively varied in proper direction and magnitude to maintain (in the vertical column 105) a predetermined desired density of the charge.

In Fig. 9 I illustrate an arrangement which I may use to maintain the fluid column 104 at a constant temperature in case the ambient temperature is likely to vary. The column 104 is jacketed and is supplied with a fluid under control of a thermostatically actuated valve 120. The jacketing fluid may for example be saturated steam, in which case a pressure control on the valve 120 will maintain a substantially constant temperature on the column 104. If it were possible to have a sealing liquid in the column 104 and in the meter 102 having a zero temperature coefficient, then it would be unnecessary to provide the jacketing or constant temperature means shown in Fig. 9, inasmuch as no effect of ambient temperature upon the column of liquid 104 would be felt as an inaccuracy of measurement of density in the column 105.

It is appreciated that pressure drop due to friction loss through the vertical column 105 may throw an inaccuracy into the measurement of density of the fluid within the column 105, and to compensate the device 102 for such pressure drop due to friction loss I illustrate in Figs. 10 and 11 a form that the connection 121 may take. In other words, the nipple comprising the connection 121 may extend within the column 105 as illustrated in Fig. 10 and be bent to receive a part of the velocity head. This head varies substantially as the square of the velocity, as does the friction loss between the connections. Accordingly, it is apparent that as the velocity increases, giving a greater pressure drop between the connections, the pressure at the upper connection will likewise increase, thereby compensating for this increase in pressure drop. As shown in Fig. 11, the nipple 121 may be made adjustable so that the increase in velocity may be made to correspond exactly to the increase in pressure loss. With the nipple pointing directly upstream full velocity head would be obtained. As this nipple is rotated the percent of velocity head will be decreased, so that at 90° there would be substantially no velocity head impressed on the connection 121. By running a fluid of constant density through the pipe 105, but at different velocities, this nipple can be adjusted so that regardless of such changes in velocity the recording device 102 remains at the correct reading.

Inasmuch as density is an absolute value of weight per unit of volume it is immaterial whether the fluid flowing through the path 1 at the measuring column 105 is in the liquid, vapor or liquid-vapor state. The density of this fluid will be determined in situ under the existing conditions of phase, temperature, and pressure. The variables affecting such measurement, of which I am aware, namely, pressure drop due to pipe friction or velocity, and the effect of ambient temperature upon the fixed column of known liquid 104, may be compensated for as explained in connection with Figs. 9, 10 and 11.

Specific gravity is defined as the relation between the density of a fluid and the density of a reference fluid, referred to the same temperature standard. Thus, if it is desired to ascertain the specific gravity of the total charge flowing through the column 105, it is only necessary that the fluid in the column 104 be maintained at the same temperature as the fluid in column 105 and the device 102 calibrated to read in terms of specific gravity to any desired reference. Inasmuch as many oil tables and calculations used in determining stock characteristic factor are in terms of specific gravity rather than in terms of density it may be of advantage to have the device 102 calibrated to read specific gravity of the fluid within the column 105.

This may be readily accomplished if the reference liquid within the column 104 has substantially the same coefficient of expansion as the fluid within the column 105. I have found that various combinations of glycerine and water, for example, may be made to approximate the temperature coefficient of expansion of various fluids.

Fig. 12 illustrates one possible arrangement wherein the column 104 may be located within the column 105 so that the temperatures may be the same. The top of the column 104 may be constructed as indicated at 122 in Fig. 13 that the fluid within the column 105 does not actually contact or mix with the fluid within the column 104.

It is assumed that the flow path 1 is of substantially the same internal cross-sectional area and resistance to flow in the horizontal portion of Fig. 7, wherein is located the orifice 5, and in the vertical column 105. On this assumption a correction of the value indicated by the device 102, to compensate for pressure drop due to pipe friction may be ascertained, as illustrated in Fig. 14, wherein the device 123 is connected to span an equal length of the conduit 1 in the horizontal run as the device 102 spans in the vertical run 105. Thus the device 123 will indicate a pressure differential caused by pipe friction and which will vary with velocity and weight rate of flow. In using the density of the column 105, or the specific gravity thereof, in determining the time of detention or yield per pass of the unit as a whole, the reading of the indicator 106 relative to the index 107 may be properly corrected in accordance with pipe friction loss by the reading of the device 123 on its indicator. Furthermore, the device 123 may position a resistance 124 to establish a resistance value or an electrical value which may be included in the circuit with either the resistance 47 or the resistance 103 to automatically correct for any error introduced into the values of 47 or 103 due to pipe friction in the column 105.

It is further possible to run the necessary experiments or tests whereby the pipe friction curves may be established for the column 105 under different values of rate of flow and thereafter to utilize the readings of the indicator 8 as a compensation value of the readings 107, or to automatically compensate the readings 107 by a resistance which may be positioned by the meter 3. Of course, such resistance and compensation would be properly calibrated so that the differential pressure and/or rate of flow determined across the orifice 5 may be used to directly or inferentially ascertain the correction for pipe friction loss in the column 105 at different rates of flow and velocities.

In Fig. 7 I have indicated at 125 a regulating valve for controlling the firing, and at 126 a regulating valve for controlling the total rate of charge flow. At 127 I indicate a back pressure valve which may be used under certain conditions.

Referring to Fig. 15 I show therein the general arrangement on which automatic control features have been superimposed. It will be observed that the valves 125, 126 are shown as of the diaphragm actuated type subject to a pneumatic loading pressure, which may be established by any one of pilot valves 130 of the type disclosed and claimed in the patent to Johnson 2,054,464. This type of pilot valve is similar to the one indicated at 119 on Fig. 8. Loading pressures are established by the various pilot valves representative of the different determinations, such as density, mean density time of detention, and yield per pass, and are led through selector valves 128, 129 so that the treatment constituting either a control of the heating and/or a control of the rate of charge may be automatically regulated selectively from one or more of such determinations.

In Fig. 16 I show a pilot valve 156 positioned by and with the indicator arm 150 to continuously provide an air loading pressure representative of yield per pass and selectively useful in the control of the treatment, processing, heating, and/or the rate of charge of the fluid being treated.

It will be observed that various combinations of control may be utilized, as for example I may control the firing alone from one of the determinations, or the rate of charge alone from one of the determinations, or may control both the firing and rate of charge in parallel from one of the determinations. In fact, any desired combination of control to produce optimum conditions may be used.

While I have chosen to illustrate and describe certain embodiments of my invention, it will be understood that I am to be limited thereby only as to the claims in view of prior art.

What I claim as new, and desire to secure by Letters Patent of the United States, is:

1. Apparatus for controlling the treating of a flowing fluid undergoing condition change as a result of the treating, comprising in combination, means continuously determining the density of the fluid entering the treating zone, means separately continuously determining a flow rate factor of the fluid prior to and subsequently to the treating, means correlating the determinations to evaluate density of the fluid subsequent to the treating, and apparatus for controlling the treating responsive to said last-named means.

2. Apparatus for controlling the treating of a flowing fluid undergoing condition change as a result of the treating, comprising in combination means continuously determining the density of the fluid entering the treating zone, means continuously determining the weight rate of flow of the fluid compensated for variations in density of the fluid prior to treatment, means continuously determining a flow rate factor of the fluid subsequent to the treating, means correlating the determinations to evaluate density of the fluid subsequent to the treating, and apparatus for controlling the treating responsive to said last-named means.

3. The method of controlling the yield per pass of a forced circulation fluid undergoing condition change as a result of treatment in a treating zone, which includes, continuously determining the density of the fluid entering the treating zone, continuously determining the time of detention of the fluid in the zone, correlating the determinations to evaluate the yield per pass of the fluid through the zone, and utilizing the evaluation to control the treatment.

4. The method of controlling the treatment of a flowing fluid undergoing condition changes as a result of the treatment consisting in continuously determining the density of the fluid entering the treatment zone, separately continuously determining a flow rate factor of the fluid prior to and subsequent to the treatment, correlating the said determinations to evaluate density of the fluid subsequent to the treatment and controlling the treatment responsive to said evaluation.

5. Apparatus adapted to continuously determine and control the yield per pass of a fluid treating system including in combination means continuously determining the time of detention of the fluid in the system, means continuously determining the specific gravity of the fluid entering the system, means correlating such determinations in terms of yield per pass, and apparatus responsive to said determinations for controlling the treatment of the fluid to maintain the yield per pass at an optimum value.

RAYMOND D. JUNKINS.

CERTIFICATE OF CORRECTION.

Patent No. 2,323,180.   June 29, 1943.

RAYMOND D. JUNKINS.

It is hereby certified that error appears in the above numbered patent requiring correction as follows: In the drawings, Sheet 8, Figure 16 should appear as shown below instead of as in the patent -

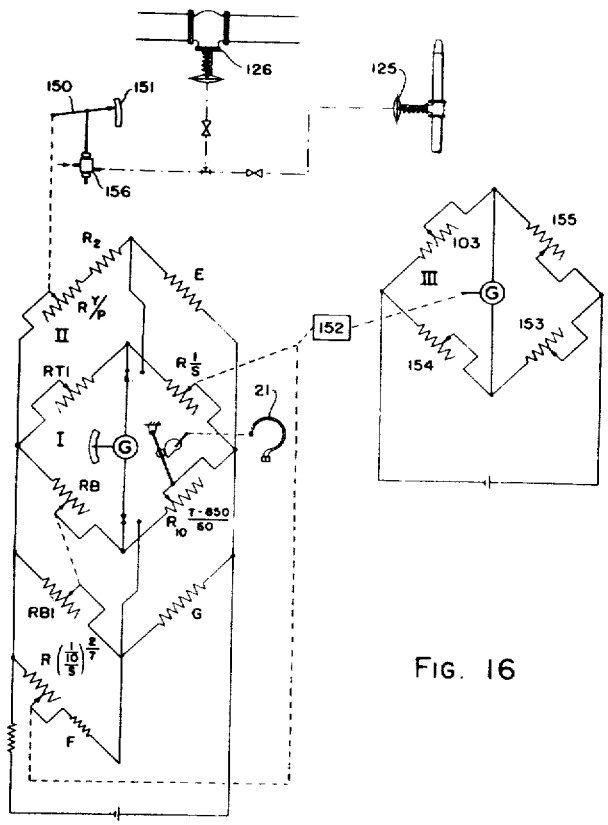

FIG. 16 page 2, first column, line 57, strike out the words "composition of the charge, or its condition,"; page 3, second column, line 35, strike out the equation numeral "(3)" and insert the same to the right of the equation in line 41, same page and column; page 4, first column, line 53, Equation 6, for "cfd$^2$" read --cfD$^2$--; line 71, Equation 7, for "h$^5$" read --h$_5$--; and that the said Letters Patent should be read with this correction therein that the same may conform to the record of the case in the Patent Office.

Signed and sealed this 30th day of November, A. D. 1943.

(Seal)

Henry Van Arsdale,
Acting Commissioner of Patents.